Jan. 18, 1966

R. L. ANSPACH 3,229,678

LUBRICATING DEVICE

Filed June 8, 1965

INVENTOR.
Roy L. ANSPACH
BY
THOMAS P. MAHONEY
ATTORNEY

Jan. 18, 1966  R. L. ANSPACH  3,229,678
LUBRICATING DEVICE
Filed June 8, 1965  3 Sheets-Sheet 3

INVENTOR.
ROY L. ANSPACH
BY
THOMAS P. MAHONEY
ATTORNEY

United States Patent Office 3,229,678
Patented Jan. 18, 1966

3,229,678
LUBRICATING DEVICE
Roy L. Anspach, 2907 Blueridge Ave., Orange, Calif.
Filed June 8, 1965, Ser. No. 462,382
10 Claims. (Cl. 123—196)

This application is a continuation-in-part of my copending application Serial No. 277,543, filed May 2, 1963, for "Lubricating Device."

This invention relates to a lubricating device particularly adapted for utilization in conjunction with an internal combustion engine to permit the components of said engine disposed in contiguity to the inlet manifold of said engine to receive a charge of lubricant when said engine is started.

By the use of the lubricating device of the invention, it is possible to lubricate the upper portions of the cylinders, valves, and valve guides of an associated internal combustion engine and, thus, reduce the wear upon said components occasioned by the fact that the engine may have remained inoperative for a long period without adequate lubrication.

Conventional upper cylinder lubricators have been characterized by the fact that they would deliver a charge of lubricant to the associated engine each time the engine was started. Consequently, where the engine is started after operating for short intervals of time, a relatively large quantity of top cylinder lubricant is fed to the inlet manifold resulting in excessive use of the lubricant and the consequent rapid depletion of the supply thereof.

It is, therefore, an object of my invention to provide a lubricating device of the aforementioned character which includes means for preventing repeated discharges of lubricant to the associated internal combustion engine where the internal combustion engine is repeatedly started and stopped during a relatively short period of time.

Another object of my invention is the provision of a lubricating device of the aforementioned character which includes a discharge chamber having a discharge piston mounted therein with the clearance between the perimeter of the discharge piston and the adjacent wall of the discharge chamber being such that the discharge piston will be maintained at the upper extremity of the discharge chamber and will sink very slowly through the lubricant in the discharge chamber until it reaches the lower extremity thereof. As a result of the close fit between the perimeter of the piston and the wall of the discharge chamber, the piston does not reach the lower extremity of the discharge chamber for approximately three to three and one-half hours after the engine is stopped.

Therefore, if the engine with which the lubricating device is associated should be repeatedly started and stopped, the piston will not have reached a location in the discharge chamber in which a significant amount of lubricant will be discharged from the discharge chamber to the inlet manifold of the internal combustion engine. As a result, the excessive distribution of lubricant to the associated internal combustion engine characteristic of prior art devices has been eliminated.

A further object of my invention is the provision of a lubricating device of the aforementioned character which is extremely compact and which is characterized by the provision of a mounting bracket incorporating all of the components of the lubricating device in a single, compact assembly.

The lubricating device of my invention is adapted for use in conjunction with maritime engines and, particularly, with engines of power cruisers which are characteristically used sporadically and subject to long periods in which they are not operated. During such long periods of nonuse, internal combustion maritime engines tend to be subject to the deteriorative effect of sea air and moisture and one of the greatest problems encountered in the maintenance and utilization of maritime engines is the seizing and premature wear of such engines attributable to the aforementioned ambient deteriorative factors.

A further object of my invention is the provision of a lubricating device of the aforementioned character which includes a lubricant discharge chamber adapted for administering an initial charge of lubricant to an associated internal combustion engine and which also includes a sight glass disposed in encompassing relationship with said discharge chamber, said sight glass being operatively connected to the intake manifold of the associated internal combustion engine and having a valve connected thereto adapted to administer a charge of lubricant to the intake manifold of the internal combustion engine of a power cruiser or the like immediately prior to stopping the engine.

Therefore, a charge of lubricant is delivered to the components of the engine immediately adjacent the intake manifold and this coating of lubricant remains on these components for a long period of time, eliminating the deteriorative effect of the sea air and moisture to which the internal combustion engine would ordinarily be subjected.

Other objects and advantages of my invention will be apparent from the following specification and the accompanying drawings, which are for the purpose of illustration only and in which.

Figure 1:
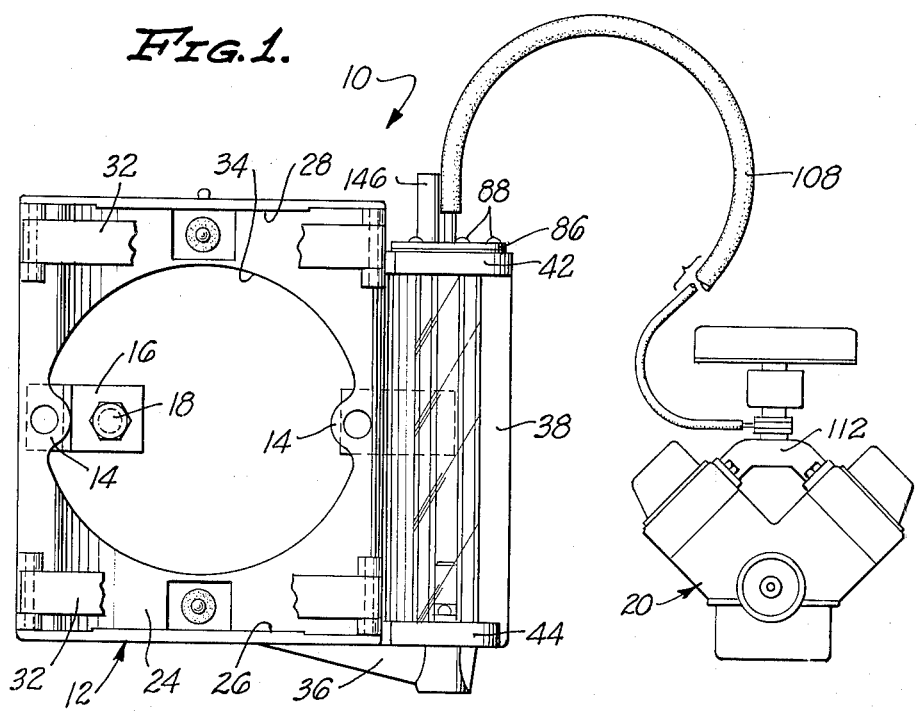
FIG. 1 is a front elevational view of a lubricating device constructed in accordance with the teachings of my invention.
Figure 2:
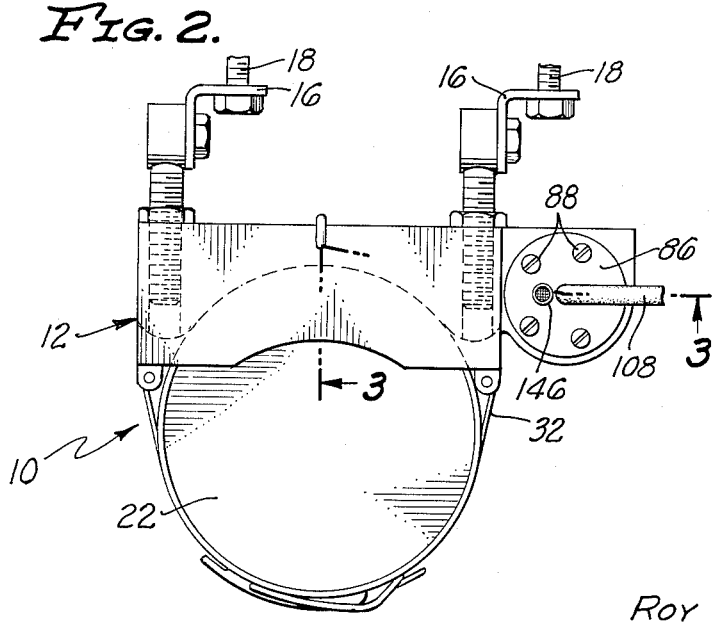
FIG. 2 is a top plan view thereof.

Referring to the drawings, and particularly to FIGS. 1–2 thereof, I show a lubricating device 10 constructed in accordance with the teachings of my invention and including a unitary mounting bracket 12 which may be fabricated by die casting or similar processes from any suitable material, such as aluminum, plastic, or the like. The unitary mounting bracket 12 incorporates threaded bosses 14 for permitting the affixation of said bracket by means of support clips 16 to any vertical, angled, or horizontal surface adjacent an internal combustion engine 20, such as the fire wall located in proximity to said engine.

Figure 3:
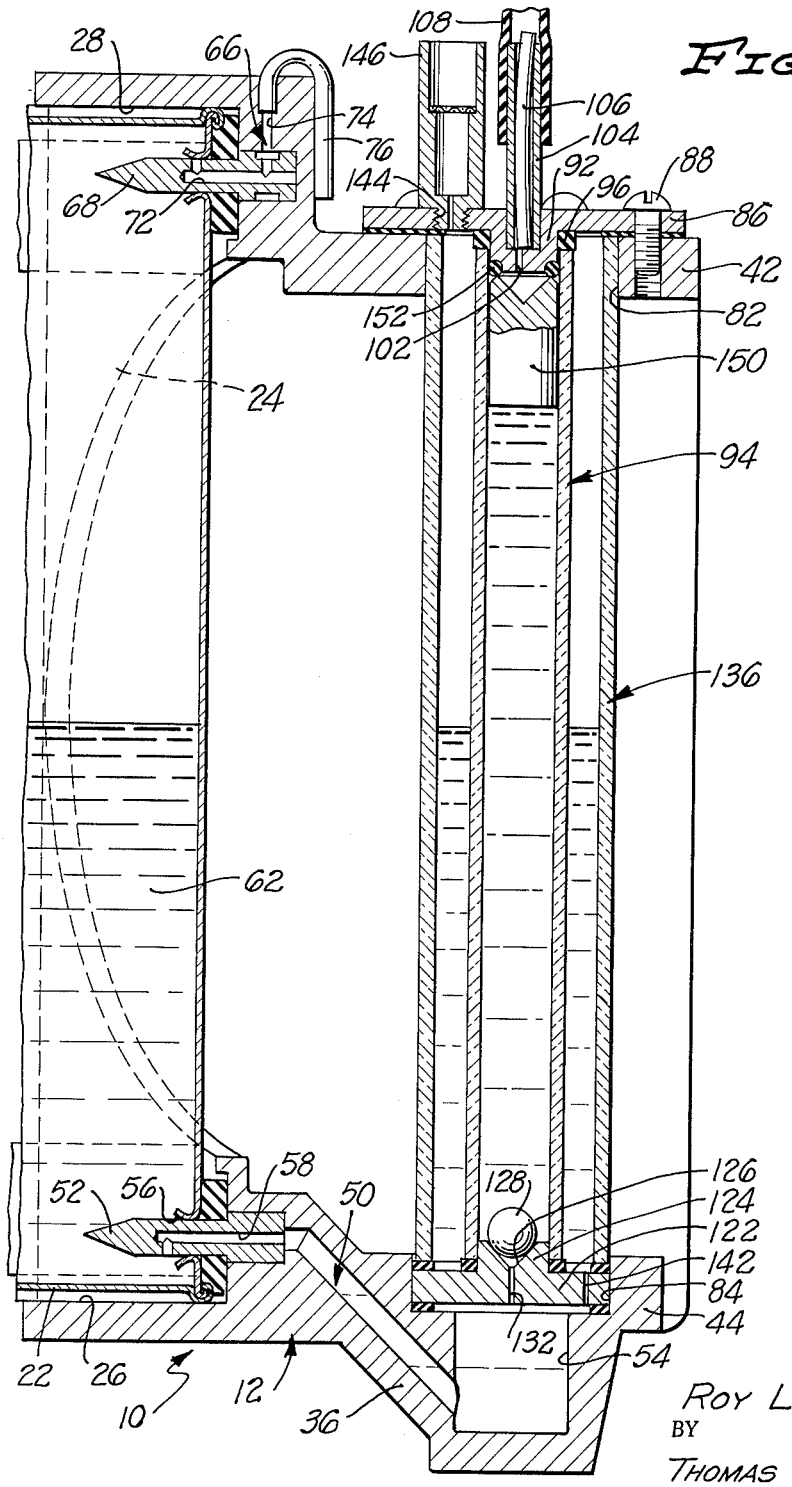
FIG. 3 is a vertical, sectional view taken on the broken line 3—3 of FIG. 2.
Figure 4:
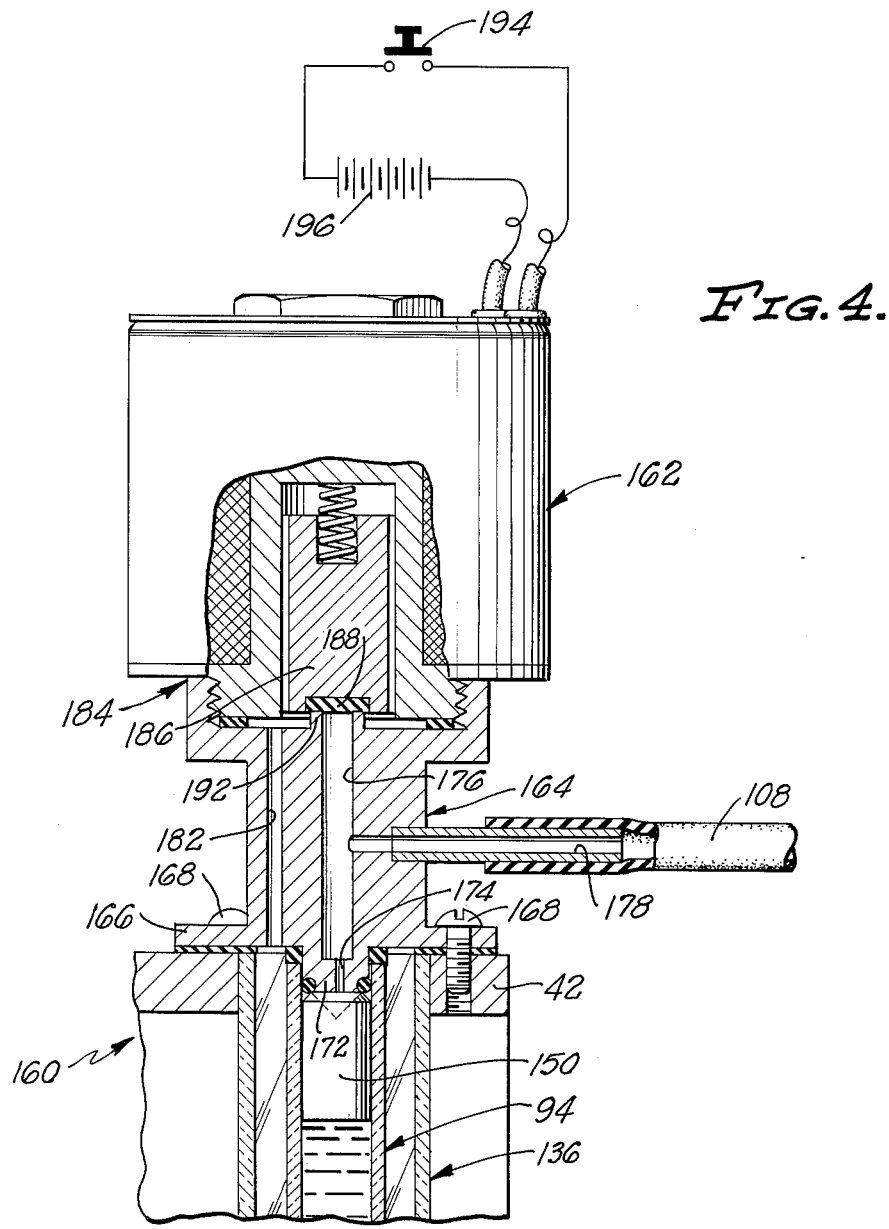
FIG. 4 is an enlarged, fragmentary sectional view showing a modification of the lubricating device of my invention.

The mounting bracket 12 provides a support for a cam 22 of lubricant constituted by an arcuate wall 24 and lower and upper supporting surfaces 26 and 28, respectively. The arcuate wall 24 is adapted, as best shown in FIGS. 2 and 3 of the drawings, to receive the adjacent portion of the wall of the can 22 of lubricant and the bottom and top of the can 22 are adapted to be juxtaposed to the supporting surfaces 26 and 28, respectively.

Operatively mounted upon the upper and lower extremities of the bracket 12 are toggle clamps 32 which maintain the can 22 of lubricant in operative relationship with the bracket 12 and the support constituted by the arcuate wall 24 and the bottom and top supporting surfaces 26 and 28. The arcuate wall 24 is provided with a relatively large circular opening 34 to reduce the amount of material utilized in said wall to lighten the mounting bracket 12.

Formed integrally with the mounting bracket 12 is a laterally offset mounting portion 36 which includes a vertical wall 38 having top and bottom mounting pads 42 and 44 associated therewith. Formed in the bottom of the mounting bracket 12 is lubricant outlet passage means 50 which communicate at its inlet end with a piercing prong 52 located in proximity to the bottom supporting surface 26 of the can support and at its outlet end with a lubricant distributing chamber 54, which is formed in the bottom pad 44, as best shown in FIG. 3 of the drawings.

The piercing prong 52 is adapted to pierce an opening 56 in the wall of the can 22 adjacent its lower extremity, and incorporates an outlet passage 58 permitting lubricant 62 to flow through the outlet passage means 50 into the lubricant distributing chamber 54.

Air vent passage means 66 is provided at the upper extremity of the mounting bracket 12 and includes a piercing prong 68 having a horizontal passage 72 therein, a vertical passage 74 and an air inlet pipe 76 in communication with the upper extremity of said vertical passage. Consequently, ambient air is admitted to the upper extremity of the interior of the can 22 to permit the free flow of lubricant through the lubricant outlet passage means 50 to the lubricant distributing chamber 54.

It will be noted that the lower extremity of the air inlet tube 76 is downwardly bent to prevent the excessive weeping of lubricant over the upper surface of the bracket 12. In addition, the ingress of contaminants into the interior of the air inlet vent passage 66 is restricted by the downward orientation of the lower extremity of the air inlet tube 76.

The upper mounting pad 42 incorporates a vertically oriented opening 82 which is concentric with a circular counterbore 84 formed in the bottom mounting pad 44 immediately adjacent the lubricant distribution chamber 54. Supported immediately adjacent the opening 82 is an upper mounting plate 86 which is circular in configuration and is secured in operative relationship with the upper surface of the upper mounting pad 42 by screws 88.

A cylindrical boss 92 is integral with the upper mounting plate 86 and depends into the opening 82 for supportive engagement with the upper extremity of a cylindrical discharge chamber 94. The discharge chamber 94 may be fabricated from any suitable material but, in the present embodiment of the invention, is fabricated from heat-resistant glass, such as Pyrex. The upper extremity of the discharge chamber 94 engages a sealing ring 96 which prevents fluid leakage from said upper extremity.

Formed in the depending cylindrical boss 92 is a lubricant outlet port 102 which communicates with an outlet tube 104 having a restrictor 106 therein. The upper extremity of the outlet tube 104 is connected to a length of flexible tubing 108, whose opposite extremity is connected to the inlet manifold 112 of the internal combustion engine 20.

A circular, lower mounting plate 122 is located in the counterbore 84 and is provided with an upstanding cylindrical boss 124 which is encompassed by the lower extremity of the discharge chamber 94. A valve seat 126 is formed in the upper extremity of the cylindrical boss 124 and receives a ball check valve 128 which prevents return flow of lubricant from the interior of the discharge chamber 94 through an inlet port 132 formed centrally of the lower support plate 122.

Mounted in the upper opening 82 and the lower bore 84, respectively, are the upper and lower extremities of an elongated, cylindrical sight glass 136, which is disposed in encompassing and concentric relationship with the discharge chamber 94 and which is adapted to receive lubricant from the lubricant distributing chamber 54 through a port 144, as best shown in FIG. 3 of the drawings.

The sight glass 136 is formed from heat-resistant glass, such as Pyrex, and the fluid level therein is maintained by the gravity flow of lubricant 62 from the lubricant distribution chamber 54 to permit an operator of a vehicle incorporating the internal combustion engine 20 to perceive the height of the lubricant 62 within the can 22.

A threaded bore 144 is formed in the upper mounting plate 86 and receives a vent fitting 146 which permits the level of lubricant 62 within the sight glass 136 to fall freely in correspondence to the level of lubricant 62 in the can 22.

Mounted in the discharge chamber 94 is a cylindrical discharge piston 150 which is formed from a suitable metal, such as aluminum, and has a very small clearance, such as .0045, with the adjacent wall of the discharge chamber 94. The upper extremity of the piston 150 seats upon an O-ring 154 to prevent lubricant 62 from by-passing the piston 150 into the outlet port 102.

The installation of the lubricating device 10 on an appropriately oriented, vertical, horizontal, or angular surface, such as the fire wall or fender apron of the vehicle in which the internal combustion engine 20 is located, is accomplished by the securement of the mounting bracket 12 to the mounting clips 16 by the associated bolts. The tubing 108 is then connected between the outlet tube 104 and the intake manifold 112 by connection to a fitting associated with the carburetor of the internal combustion engine 20.

A sealed can 22 of lubricant is then inserted into the space between the supporting surfaces 26 and 28, and the wall of the can is punctured by the prongs 52 and 68. The lubricant 62 immediately flows through the channel 58 in the prong 52 and into the lubricant outlet passage means 50 and from the outlet passage means 50 into the lubricant distribution chamber 54. The lubricant 62 will then initially flow upwardly through the inlet port 132 into the discharge chamber 94 by by-passing the ball check valve 128 and the discharge piston 150.

The normal location of the discharge piston 150 is at the bottom of the discharge chamber 94 in immediate juxtaposition to the top of the ball check valve 128. In addition, the lubricant 62 will flow from the distribution chamber 54 through the port 142 into the space between the sight glass 136 and the perimeter of the discharge chamber 94 to indicate the level of the lubricant within the can 22 of lubricant 62.

When the internal combustion engine 20 is started, the vacuum generated in the intake manifold 112 thereof will be communicated through the tubing 108 to the discharge chamber 94, causing the lubricant above the piston 150 to be drawn through the tubing 108 and into the intake manifold 112 of the internal combustion engine 20. Upward discharge of the lubricant in the discharge chamber 94 will cause the piston 150 to be moved upwardly, creating a vacuum therebelow.

The vacuum created by upward movement of the discharge piston 150 causes the influx of lubricant from the distribution chamber 54 and the can 22 of lubricant dislodging the check valve 128 from the seat 126 and permitting the discharge chamber 94 to be filled with lubricant. The piston 150 is obviously maintained in its uppermost position during operation of the engine 20 by the vacuum in the intake manifold 112.

Because of the relatively close tolerance between the perimeter of the discharge piston 150 and the interior wall of the discharge chamber 94, the body of lubricant below the discharge piston 150 retards downward movement of the discharge piston 150 to its inoperative, lowermost position in the discharge chamber 94 after the engine 20 is stopped.

Of course, the close tolerance between the piston 150 and the inner wall of the discharge chamber 94 can be determined so as to restrict the downward movement of the discharge piston 150 to any reasonable length of time but, in the present embodiment of the invention, three to three and one-half hours after the engine 20 is stopped is consumed before the discharge piston 150 is located in the lowermost position in which it will discharge a full charge of lubricant from the discharge chamber 94 when the engine 20 with which it is associated is started after having been stopped.

Consequently, when the engine 20 is started, run for a short distance and stopped, the discharge piston 150 will be at the upper extremity of the discharge chamber 94 and, thus, starting of the engine 20 after a short intervals of time, will only cause a relatively minute amount of lubricant to be discharged from the discharge chamber 94 above the piston 150. Therefore, the waste of lubricant characteristic of prior art devices, is avoided.

Another factor which tends to prevent the wasteful discharge of excessive quantities of lubricant from the discharge chamber 94 where an engine is repeatedly started and stopped, is the difference between the coefficients of friction of the metallic piston 150 and the glass discharge chamber 94. Therefore, when the engine becomes sufficiently heated, the piston 150 will expand to a greater extent than the glass discharge chamber 94, thus reducing further the already small clearance between the perimeter of the piston 150 and the inner wall of the discharge chamber 94 and causing the period of time consumed in the descent of the piston 150 through the fluid in the discharge chamber 94 to become even greater.

The lubricating device is fragmentarily shown in another embodiment 160 as including a valve 162 which is mounted upon the upper mounting pad 42, in a manner to be described in greater detail below. The valve 162 is incorporated in the lubricating device 160 as an alternative for the top mounting plate 86, and is supported on the top mounting pad 42 by means of a support column 164 which has a circular mounting flange 166 at its lower extremity secured in operative relationship with the top mounting pad 42 by means of screws 168.

The support column 164 has a centrally located, depending cylindrical bore 172 which incorporates an outlet port 174 communicating with an outlet passage 176 in the column, which communicates with an outlet tube 178 connected to the flexible tubing 108 which is connected at its outermost extremity to the inlet manifold 112 of the engine 20.

Also incorporated in the column 164 is an outlet passage 182 which communicates with the upper extremity of the chamber defined between the sight glass 136 and the outer perimeter of the discharge chamber 94. The valve 162 is electrically actuated by means of a solenoid 184, which causes a plunger 186 having a valve member 188 in the lower extremity thereof to unseat from a seat 192 at the upper extremity of the outlet passage 176.

Therefore, when a switch 194 is closed, a circuit is made through a battery 196 which energizes the solenoid to lift the plunger 186 and unseat the valve member 188 from the associated seat 192. This action takes place at the time when the engine of a power cruiser or the like is to be shut down and provides a final discharge of lubricant which is drawn from the sight glass chamber upwardly through the passage 182 past the seat 192 into the outlet passage 176, thence through the outlet tube 178 and the tubing 108 into the intake manifold 112 of the engine 20. Therefore, the lubricating device 160 is adapted particularly for utilization in conjunction with marine internal combustion engines and, by providing for a final discharge of lubricant into the intake manifold of the engine, imparts a coating of lubricant to vital working components of the engine which last for a long period of time while the engine is shut down.

I thus provide by my invention a lubricating device which is particularly adaptable for use with internal combustion engines and which is characterized by the compactness of the assembled component parts and the ease with which it may be utilized in conjunction with canned lubricant, rather than bulk lubricant.

In addition, the lubricating device of my invention is particularly suitable for use in conjunction, in one embodiment thereof, with internal combustion engines used in powering various types of boats.

I claim:

1. In a lubricating device for lubricating an internal combustion engine, the combination of: a mounting bracket for location in proximity to said internal combustion engine; a lubricant receptacle support on said mounting bracket for receiving and supporting a can of lubricant; lubricant outlet passage means provided in said bracket adjacent said support for communication with the interior of said can of lubricant; a lubricant discharge chamber having its lower extremity in communication with said lubricant outlet passage means; a lubricant discharge piston mounted in said chamber for limiting the amount of lubricant discharge from said discharge chamber; a check valve mounted in the lower extremity of said discharge chamber for maintaining a predetermined amount of fluid in said discharge chamber; a lubricant conveying tubing connecting said discharge chamber to an internal combustion engine; and a transparent sight glass mounted in encompassing relationship with said discharge chamber to permit the visual determination of the contents of a can of lubricant mounted on said support.

2. In a lubricating device for association with an internal combustion engine, the combination of: a mounting bracket disposable adjacent said internal combustion engine; a lubricant receptacle support on said mounting bracket; lubricant outlet passage means having a can-puncturing prong at the inlet end thereof for communication with the interior of said can of lubricant; air inlet passage means provided at the upper extremity of said support; a piercing prong located at the inlet end of said air inlet passage means for communication with the interior of said can of lubricant; a lubricant discharge chamber having its lower extremity in communication with said lubricant outlet passage means; a lubricant discharge piston mounted in said chamber for limiting the amount of lubricant discharged from said discharge chamber; a check valve mounted in the lower extremity of said discharge chamber for maintaining a predetermined amount of fluid in said discharge chamber; a lubricant conveying tubing connecting said discharge chamber to an internal combustion engine; and a transparent sight glass mounted in encompassing relationship with said discharge chamber to permit the visual determination of the contents of a can of lubricant mounted on said support.

3. In a lubricating device for lubricating the components of an internal combustion engine disposed in contiguity to the inlet manifold of said engine, the combination of: a mounting bracket securable in contiguity to said engine; a lubricant can support on said mounting bracket; securement means on said mounting bracket adjacent said support for maintaining said can on said support; lubricant outlet passage means located adjacent the base of said support; means for connecting the inlet end of said lubricant outlet passage means to the lower extremity of the can of lubricant mounted on said support; a lubricant discharge chamber in communication with the outlet end of said lubricant outlet passage means; a piston in said discharge chamber for determining the amount of lubricant fed from said discharge chamber to said engine, said piston being closely fitted to the wall of said discharge chamber to cause it to move slowly downwardly, after said engine is stopped, in said discharge chamber after a charge of lubricant has been fed from said discharge chamber; a check valve in the lower extremity of said discharge chamber for maintaining a supply of lubricant in said discharge chamber; and a transparent sight glass encompassing said discharge chamber and having its lower extremity in communication with the outlet end of said lubricant outlet passage means.

4. In a lubricating device for lubricating the components of an internal combustion engine disposed in contiguity to the inlet manifold of said engine, the combination of: a mounting bracket securable in contiguity to said engine; a lubricant can support on said mounting bracket; securement means on said mounting bracket adjacent said support for maintaining said can on said support; lubricant outlet passage means located adjacent the base of said support; means for connecting the inlet end of said lubricant outlet passage means to the lower extremity of the can of lubricant mounted on said support; a lubricant discharge chamber in communication with the outlet end of said lubricant outlet passage means; a piston in said discharge chamber for determining the amount of lubricant fed from said discharge chamber to said engine, said piston being closely fitted to the wall of said discharge chamber to cause it to move slowly downwardly, after said engine is stopped, in said discharge chamber after a charge of lubricant has been fed from said discharge chamber; a check valve in the lower extremity of said discharge chamber for maintaining a supply of lubricant in said discharge chamber; a transparent sight glass encompassing said discharge chamber and having its lower extremity in communication with the outlet end of said lubricant outlet passage means; and an air vent communicating with the upper extremity of said sight glass.

5. In a lubricating device for lubricating the components of an internal combustion engine disposed in contiguity to the inlet manifold of said engine, the combination of: a mounting bracket securable in contiguity to said engine; a lubricant can support on said mounting bracket; securement means on said mounting bracket adjacent said support for maintaining said can on said support; lubricant outlet passage means located adjacent the base of said support; means for connecting the inlet end of said lubricant outlet passage means to the lower extremity of the can of lubricant mounted on said support; a lubricant discharge chamber in communication with the outlet end of said lubricant outlet passage means; a piston in said discharge chamber for determining the amount of lubricant fed from said discharge chamber to said engine, said piston being closely fitted to the wall of said discharge chamber to cause it to move slowly downwardly in said discharge chamber after a charge of lubricant has been fed from said discharge chamber; a check valve in the lower extremity of said discharge chamber for maintaining a supply of lubricant in said discharge chamber; a transparent sight glass encompassing said discharge chamber and having its lower extremity in communication with the outlet end of said lubricant outlet passage means; an air vent communicating with the upper extremity of said sight glass; and electrically energized valve means disposed in communication with said air vent of said sight glass to permit a charge of lubricant from said sight glass to be drawn into said engine during the final moments of operation thereof.

6. In a lubricating device for lubricating the operating components of an internal combustion engine located in contiguity to the inlet manifold thereof, the combination of: a mounting bracket for location in juxtaposition to said engine; a lubricant can support for the reception of a can of lubricant; securement means on said bracket adjacent said support for securing a can of lubricant against dislodgment from said support; lubricant outlet passage means in said bracket having an outlet end in juxtaposition to the base of said support; piercing prong means at the inlet end of said lubricant outlet passage means for piercing the side of said can, said piercing prong having outlet passage means communicable with the inlet end of said lubricant outlet passage means; air inlet passage means on said bracket adjacent the upper portion of said support for admitting air to the upper extremity of said can; a piercing prong in communication with the inlet end of said air inlet passage means for piercing the wall of said can adjacent the upper extremity thereof for the entry of air into said can; a distribution chamber in said bracket for the reception of lubricant from the outlet end of said lubricant outlet passage means; a lubricant discharge chamber in communication with said distribution chamber, said discharge chamber having an outlet port at its upper extremity for connection to said engine; a discharge piston mounted for movement in said discharge chamber, said discharge piston being closely fitted to the wall of said chamber to cause it to return to its inoperative position very slowly so that an additional charge of lubricant will not be distributed to said engine if said engine is repeatedly stopped and started; a sight glass disposed in encompassing relationship with said discharge chamber; an inlet passage connecting said sight glass with said distribution chamber; and an air vent connecting said sight glass with the ambient air.

7. In a lubricating device for lubricating the operating components of an internal combustion engine located in contiguity to the inlet manifold thereof, the combination of: a mounting bracket for location in juxtaposition to said engine; a lubricant can support for the reception of a can of lubricant; securement means on said bracket adjacent said support for securing a can of lubricant against dislodgment from said support; lubricant outlet passage means in said bracket having an outlet end in juxtaposition to the base of said support; piercing prong means at the inlet end of said lubricant outlet passage means for piercing the side of said can, said piercing prong having outlet passage means communicable with the inlet end of said lubricant outlet passage means; air inlet passage means on said bracket adjacent the upper portion of said support for admitting air to the upper extremity of said can; a piercing prong in communication with the inlet end of said air inlet passage means for piercing the wall of said can adjacent the upper extremity thereof for the entry of air into said can; a distribution chamber in said bracket for the reception of lubricant from the outlet end of said lubricant outlet passage means; a lubricant discharge chamber in communication with said distribution chamber, said discharge chamber having an outlet port at its upper extremity for connection to said engine; a discharge piston mounted for movement in said discharge chamber, said discharge piston being closely fitted to the wall of said chamber to cause it to return to its inoperative position very slowly so that an additional charge of lubricant will not be distributed to said engine if said engine is repeatedly stopped and started; a sight glass disposed in encompassing relationship with said discharge chamber; an inlet passage connecting said sight glass with said distribution chamber; an air vent connecting said sight glass with the ambient air; and electric valve means connected with said air vent for permitting a charge of lubricant to be drawn from said sight glass prior to the stopping of said engine.

8. In a lubricating device for lubricating the components of an internal combustion engine located in proximity to the intake manifold thereof, the combination of: a mounting bracket having support means thereupon for the reception of a can of lubricant; lubricant outlet passage means in said bracket for connection to said can adjacent the lower extremity thereof; air inlet passage means in said bracket for connection to said can at the upper extremity thereof; a lubricant discharge chamber in fluid communication with said lubricant outlet passage means; a discharge piston mounted in said discharge chamber for vertical movement between lowermost and uppermost positions; a sight glass in communication with said lubricant outlet passage means; and an electrically actuated valve connected to said sight glass for permitting the quantity of lubricant in said sight glass to be drawn therefrom upon the actuation of said valve.

9. In a lubricating device for connection to the intake manifold of an internal combustion engine, the combination of: a unitary mounting bracket having support means thereupon for the reception of a can of lubricant; lubricant outlet passage means in the lower part of said bracket for connection to the interior of said can of lubricant; air inlet passage means in the upper part of said bracket for connection to the interior of the upper extremity of said can of lubricant; mounting means at one side of said bracket adjacent said lubricant can support; a lubricant discharge chamber mounted in said mounting means in fluid communication with said lubricant outlet passage means; a discharge piston in said discharge chamber; and a sight glass mounted in said mounting means in encompassing relationship with said discharge chamber, said sight glass being disposed in fluid communication with said lubricant outlet passage means.

10. In a lubricating device for connection to the intake manifold of an internal combustion engine, the combination of: a unitary mounting bracket having support means thereupon for the reception of a can of lubricant; lubricant outlet passage means in the lower part of said bracket for connection to the interior of said can of lubricant; air inlet passage means in the upper part of said bracket for connection to the interior of the upper extremity of said can of lubricant; mounting means at one side of said bracket adjacent said lubricant can support; a lubricant discharge chamber mounted in said mounting means in fluid communication with said lubricant outlet passage means; a discharge piston in said discharge chamber; a sight glass mounted in said mounting means in encompassing relationship with said discharge chamber, said sight glass being disposed in fluid communication with said lubricant outlet passage means; and a valve connected to said sight glass for permitting the lubricant disposed therein to be withdrawn upon the actuation of said valve.

References Cited by the Examiner
UNITED STATES PATENTS

| | | | |
|---|---|---|---|
| 2,722,210 | 11/1955 | Koonce | 123—196 |
| 2,865,362 | 12/1958 | Traughber | 123—196 |
| 3,024,781 | 3/1962 | Frantsevitch | 123—196 |

LAVERNE D. GEIGER, *Primary Examiner.*